US007598941B2

(12) United States Patent
Leuder et al.

(10) Patent No.: US 7,598,941 B2
(45) Date of Patent: Oct. 6, 2009

(54) POINTER FOR A LARGE DISPLAY

(75) Inventors: Roger Leuder, San Francisco, CA (US);
George G. Robertson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 803 days.

(21) Appl. No.: 11/173,547

(22) Filed: Jul. 1, 2005

(65) Prior Publication Data

US 2007/0002014 A1  Jan. 4, 2007

(51) Int. Cl.
*G09G 5/08* (2006.01)
(52) U.S. Cl. .................. 345/157; 715/856; 345/1.3
(58) Field of Classification Search ......... 345/156–157, 345/1.3; 715/856–863
See application file for complete search history.

(56) References Cited

U.S. PATENT DOCUMENTS

| | | | |
|---|---|---|---|
| 4,814,553 A | 3/1989 | Joyce | |
| 5,748,189 A * | 5/1998 | Trueblood | 715/755 |
| 5,841,440 A | 11/1998 | Guha | |
| 5,917,472 A * | 6/1999 | Perala | 345/157 |
| 6,040,821 A | 3/2000 | Franz et al. | |
| 6,369,837 B1 | 4/2002 | Schirmer | |
| 2003/0132909 A1* | 7/2003 | Haynes | 345/156 |
| 2003/0218596 A1 | 11/2003 | Eschler | |
| 2004/0113888 A1* | 6/2004 | De Waal | 345/157 |
| 2004/0167704 A1* | 8/2004 | Roux | 701/120 |
| 2004/0201628 A1 | 10/2004 | Johanson et al. | |
| 2004/0261039 A1 | 12/2004 | Pagan | |
| 2005/0041014 A1* | 2/2005 | Slotznick | 345/156 |
| 2005/0052406 A1 | 3/2005 | Stephanick et al. | |
| 2006/0143580 A1* | 6/2006 | Gimness et al. | 715/856 |

FOREIGN PATENT DOCUMENTS

WO   WO 2004/114112   12/2004

OTHER PUBLICATIONS

Microsoft Windows Cursor and Icon, O'Reilly & Associates, Inc., 1996, pp. 1-10.*
Baudisch, et al., "High-density cursor: a visualization technique that helps users keep track of fast-moving mouse cursors," http://www.patrickbaudisch.com/publications/2003-Baudisch-Interact03-HighDensityCursorpdf, Jul. 28, 2004.
Andrews, et al., "Clicky: User-centric Input for Active Spaces," http://choices.cs.uiuc.edu/~sampeman/papers/clicky-paper.pdf, Aug. 29, 2004.

(Continued)

*Primary Examiner*—Amr Awad
*Assistant Examiner*—Stephen A Bray
(74) *Attorney, Agent, or Firm*—Vierra Magen Marcus & DeNiro LLP

(57) ABSTRACT

Various technologies are provided to facilitate the use of a pointer (e.g., a cursor) with a large display (including displays that comprise multiple monitors). For example, solutions are presented for quickly moving the pointer across multiple monitors and for using multiple pointing devices. An interface is further provided with the ability to render an arbitrary image that trails the pointer to make the pointer easier to find on the large display. This image can visible be visible at all times, visible when requested by the user, or visible in response to a minimum amount of movement during a defined time period.

12 Claims, 12 Drawing Sheets

OTHER PUBLICATIONS

Chen, et al., "LumiPoint: Multi-User Laser-Based Interaction on Large Tiled Displays," http://graphics.stanford.edu/papers/multiuser/CS-TR-2000-04.pdf, Jun. 10, 2003.

Cheng, et al., "Real-time Monocular Tracking of View Frustum for Large Screen Human-Computer Interaction," http://crpit.com/confpapers/CRPITV38Cheng.pdf, 2006, Jul. 10, 2005.

Cao, et al., "VisionWand: Interaction Techniques for Large Displays using a Passive Wand Tracked in 3D," http://www.cs.toronto.edu/~caox/uist2003_visionwand.pdf, vol. 5, Issue 2, 2003 ACM, Jan. 15, 2004.

Wu, et al., "Visual Panel: Toward a Vision-Based Mobile Input Interface for Anywhere," http://research.microsoft.com/easyliving/Documents/2000%2009%20Wu%20for%20CHI.pdf, Jul. 4, 2003.

\* cited by examiner

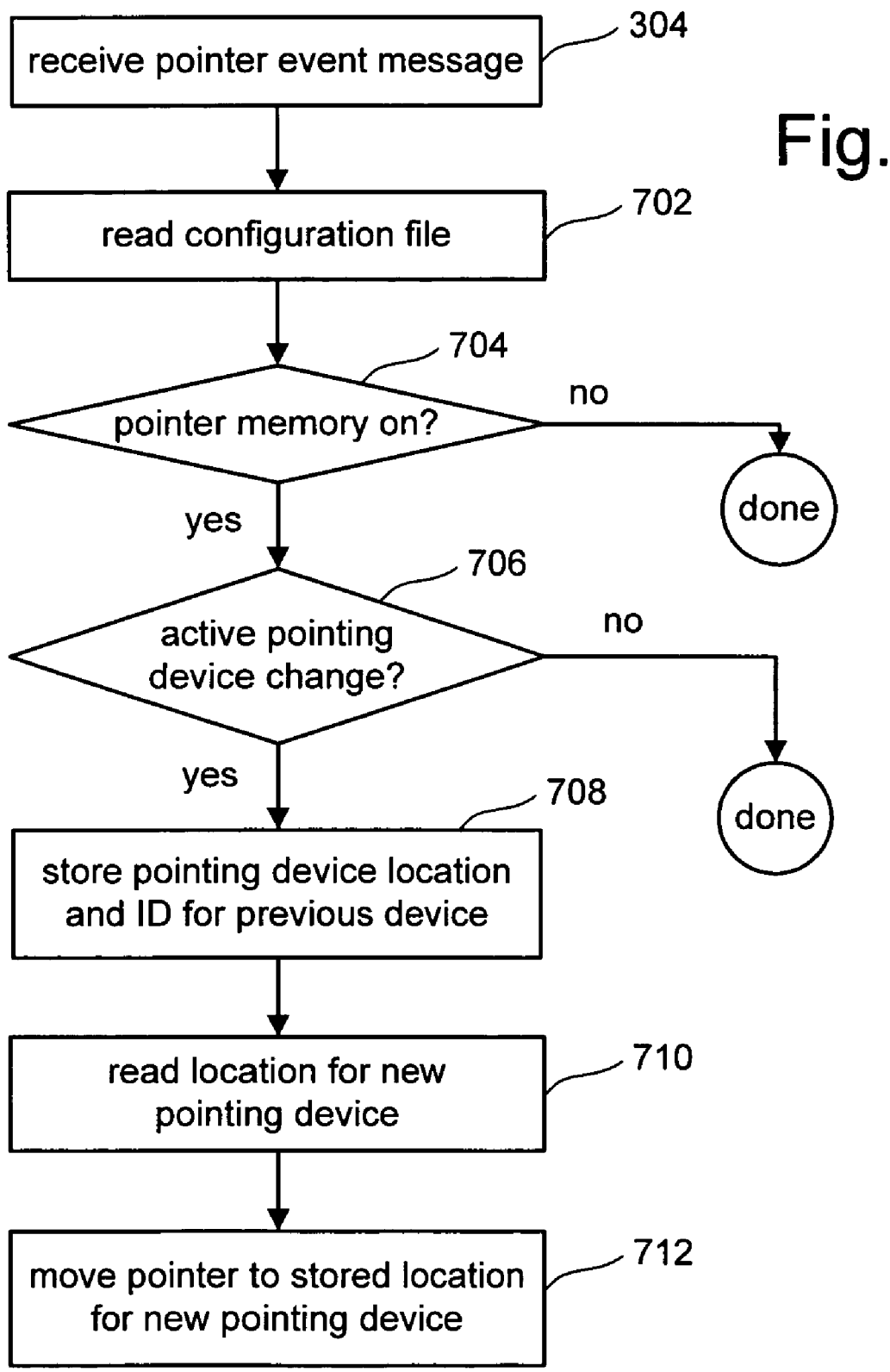

POINTER FOR A LARGE DISPLAY

BACKGROUND

Computer displays are getting larger, and it is becoming easier and more common to build large displays from multiple monitors. Though many computing systems support such large displays, they fail to adequately address some of the problems that occur in the large display environment. For example, it may be hard and time consuming to find the pointer (e.g., cursor) on a large display. Prior attempts to help the user find the pointer include temporarily displaying a circle around the pointer in response to a hotkey or displaying a pair of eyes that change direction with the movement of the pointer so that the eyes always look at the pointer. Both of these solutions do not adequately address the large display issues. First, the circle around the pointer may not be big enough and may not be provided at the appropriate times. Second, the eyes that look at the cursor may not be big enough and only point in the direction of the cursor. A user must still search for the cursor in the direction pointed to by the eyes. For a small display, this may be sufficient. For a large display, the distance of the pointer from the eyes may be too large so that the eyes are not effectively helping the user quickly and easily find the pointer.

Another issue with large displays is that moving the pointer across large distances can be time consuming and physically taxing on the user. For example, moving a pointer across many monitors may require a lot of physical movement of a mouse.

A large display may also facilitate cooperative scenarios where multiple users are sharing a single large display. In one example, two or more users each using their own pointing device can control a single pointer on a large display. Any user at any time can move the pointer. In such a scenario, the users may lose track of where the pointer is at any given time.

SUMMARY

Various technologies are provided to facilitate the use of a pointer with a large display. For example, solutions are presented for moving the pointer quickly across multiple monitors, for using multiple pointing devices, and for easily finding the pointer. These solutions can be used separately or in combination.

In one embodiment, the solution for moving the pointer quickly across multiple monitors includes providing a "snap move" mode. If enabled, when the user moves the pointer across a specified distance, the pointer will jump to the center (or another position) of the adjacent monitor before reaching the adjacent monitor.

To facilitate more efficient use of the display by either a single person with multiple pointer devices or multiple people using different pointer devices, one embodiment provides for "pointer location memory." Upon activation of a pointing device, the software positions the pointer at the last known pixel location for that pointing device.

To make the pointer easier to find in a large display, one embodiment includes providing the ability to render an arbitrary image that trails the cursor. This image can visible be visible at all times, visible when requested by the user or visible in response to a minimum pointer movement during a defined time period.

One example implementation includes determining that a pointer is moving on a display in a direction toward a second monitor while the pointer is still displayed on the first monitor, automatically moving the pointer to the second monitor before the pointer has reached the second monitor, and causing an image to be provided on the display that visually indicates where the pointer is. Another example implementation includes receiving event information for a pointer at a particular position on a display, determining (based on the received event information) that there has been a pointer controlling device change from a previous pointer controlling device to a current pointer controlling device, automatically moving the pointer from the particular position to a last pointer position on the display caused by the current pointer controlling device, and causing an image to be provided on the display that visually shows the pointer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 12 is a flow chart describing one embodiment of a process for providing a pointer memory feature so that two or more pointing devices can better operate within a large display.

DETAILED DESCRIPTION

Various technologies are provided to facilitate the use of a pointer (e.g., a cursor) with a large display. For example, solutions are presented for moving the mouse quickly across multiple monitors and for using multiple pointing devices. In combination or separately, an interface is provided with the ability to render an arbitrary image that trails the cursor. This image can visible be at all times, visible when requested by the user, or visible in response to minimum movement during a defined time period.

Figure 1:
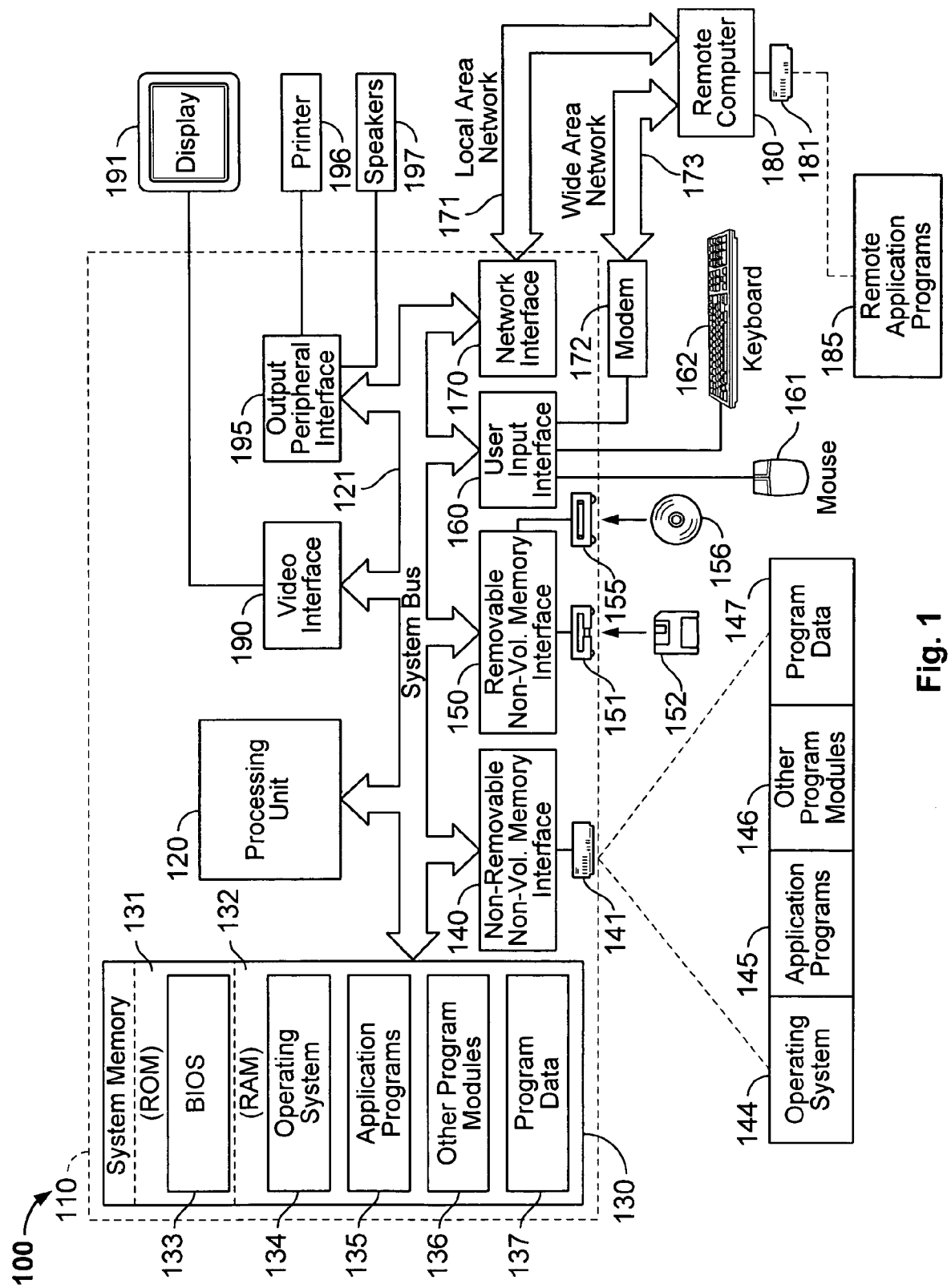
FIG. 1 is a block diagram depicting one example of a computing system.

FIG. 1 illustrates one example of a suitable general computing environment 100 that may be used with the technologies for facilitating the use of a pointer with a large display.

Computing system 100 is only one example of a suitable computing environment and is not intended to suggest any limitation as to the scope of use or functionality of the technology described herein. Neither should computing system 100 be interpreted as having any dependency or requirement relating to any one or combination of components illustrated in the exemplary operating environment 100.

The technologies described herein are operational with numerous other general purpose or special purpose computing system environments or configurations. Examples of well known computing systems, environments, and/or configurations that may be suitable for use include, but are not limited to, personal computers, server computers, hand-held or laptop devices, personal digital assistants, telephones (wired, wireless, or cellular), multiprocessor systems, microprocessor-based systems, set top boxes, programmable consumer electronics, network PCs, minicomputers, mainframe computers, distributed computing environments that include any of the above systems or devices, and the like.

The system may be described in the general context of computer-executable instructions, such as program modules, being executed by a computer. Generally, program modules include routines, programs, objects, components, data structures, etc., that perform particular tasks or implement particular abstract data types. The system may also be implemented in distributed computing environments where tasks are performed by remote processing devices that are linked through a communications network. In a distributed computing environment, program modules may be located in both local and remote computer storage media including memory storage devices.

With reference to FIG. 1, an exemplary system includes a general purpose computing device in the form of a computer 110. Components of computer 110 may include, but are not limited to, a processing unit 120 (which can include multiple processors), a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data to program the processor(s) to perform the methods described herein. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, computer 110 is connected to LAN 171 through a network interface or adapter 170. When used in a WAN networking environment, computer 110 typically includes a modem 172, network interface or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
FIG. 2 depicts a display comprising multiple monitors.

Display 191 of system 100 depicted in FIG. 1 can include multiple monitors. For example, FIG. 2 shows display 191 comprising 18 monitors 201, 202, 203, 204, 205, 206, 207, 208, 209, 210, 211, 212, 213, 214, 215, 216, 217, and 218. In one embodiment, the monitors are arranged in three rows and six columns; however, other arrangements can also be used. In addition, display 191 can include less than 18 monitors or more than 18 monitors. Each monitor can be the same size or different sizes. Monitors 201-218 can be any suitable size known or used in the art. The monitors can be LCD monitors, CRT monitors or other types of monitors. In one embodiment, each of the monitors 201-218 displays a different portion of the computer screen. In other embodiments, two or more of the monitors can overlap in displaying portions of the computer screen.

When using a large display, such as display 191 of FIG. 2, it is sometimes hard to find where the pointer (e.g., cursor) is. The pointer is controlled by a pointing device. Examples of a pointing device include a mouse, trackball, touchpad, stick, etc. For example, as a mouse is moved by a user, the point moves correspondingly on display 191. In some implementations, a computing system will use an icon to represent the location where the pointer is. The icon representing the pointer is typically very small compared to the size of one monitor. Thus, with a large display having multiple monitors, it can be fairly difficult to locate the pointer.

Figure 3:
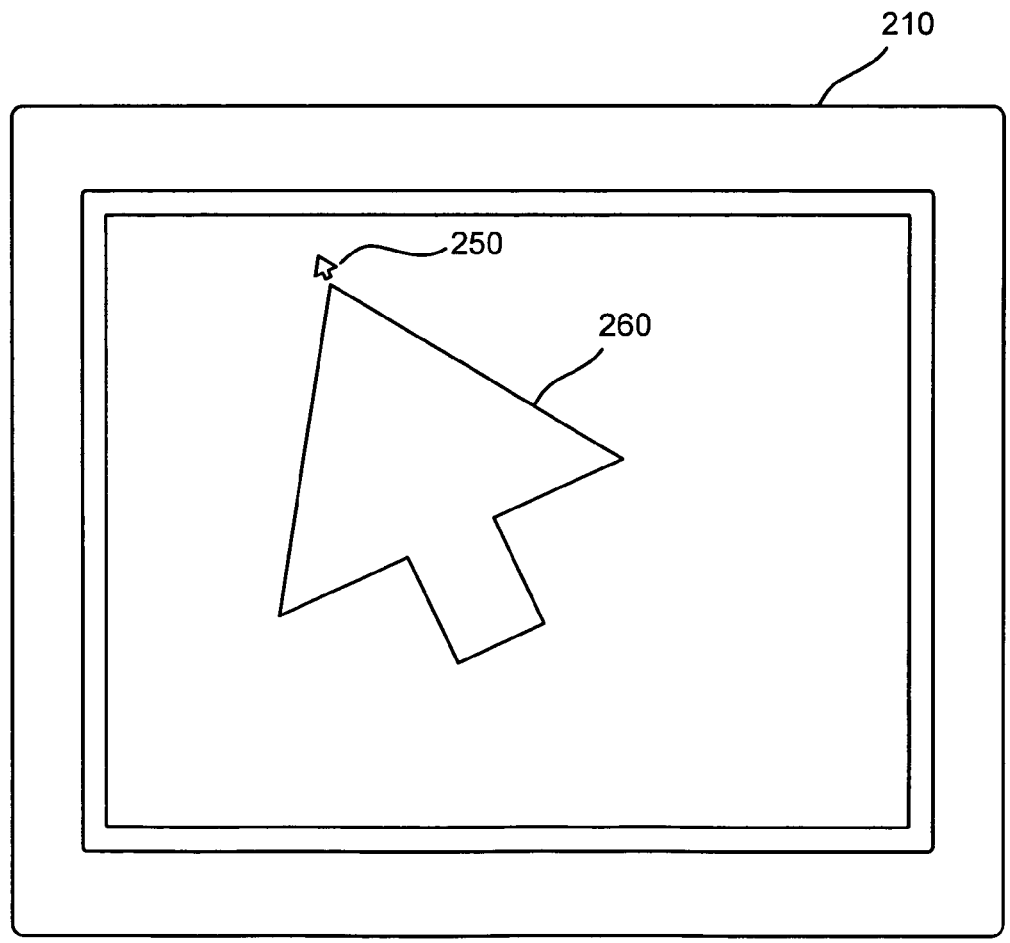
FIG. 3 depicts a monitor.

One proposed solution for locating the pointer is using a very large image to identify the pointer's location. For example, FIG. 3 shows one monitor 210 from display 191. Monitor 210 displays pointer 250. Pointer 250 is small and hard to find when looking at monitors 201-218. To help find pointer 250, image 260 is used. Image 260 is not the pointer. Rather, it is a separate image. In FIG. 3, image 260 is in the shape of an arrow, which is the same shape as pointer 250. In other embodiments, image 260 can be any other shape desired and may not be the same shape as pointer 250. In one example implementation, image 260 trails and follows pointer 250 as pointer 250 moves around display 191. Because image 250 is substantially larger than pointer 250, a user standing away from display 191 can easily find pointer 250 by first locating image 260. As such, image 260 is referred to as a "pointer finder."

There are various means for implementing when to view pointer finder 260. In one embodiment, pointer finder 260 can always be on so that user will always see pointer finder 260 and be able to easily find pointer 250. In another embodiment, pointer finder 260 will only be turned on if the user presses a "hot key." Any key on the keyboard or on the mouse can be identified in advance or dynamically as a hot key. When that hot key is pressed, pointer finder 260 will be displayed. In another embodiment, pointer finder 260 will only be displayed for a predefined amount of time after pointer 250 has moved a threshold distance during a predefined time period. Each of these embodiments will be described below.

Figure 4:
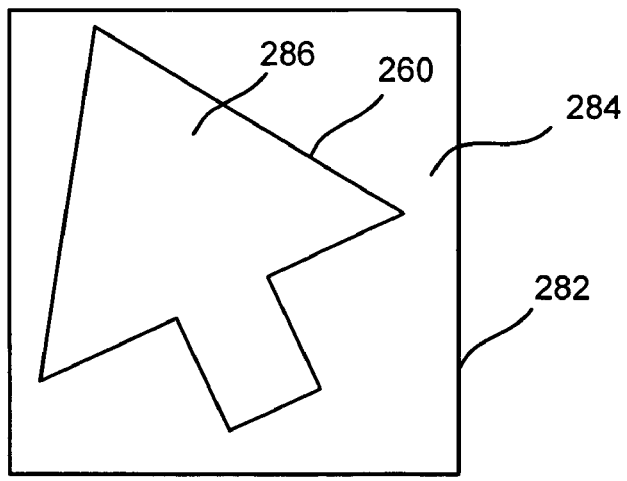
FIG. 4 depicts a window or image.

In one embodiment, pointer finder 260 is implemented as an image that is rectangular in shape. For example, FIG. 4 shows rectangular image 282. In one embodiment, image 282 is a window. Within rectangular image 282 are pointer finder image 260 (also called the foreground) and background 284. In this implementation, background 284 is transparent. Region 286 inside pointer finder 260 is provided with a color. Any color can be used. For example, gray can be used. In some embodiments, pointer finder 260 will have a shadow effect. In some embodiments, a user can provide any image to be used for the pointer finder. Thus, the image can be changed dynamically by providing a path to the desired image in a configuration file. When the user wants to change the image being used with the pointer finder, the user will provide a new path to the new image. Although FIG. 4 shows a rectangular image 282, other embodiments can use images of other shapes, sizes, configurations, etc.

Figure 5:
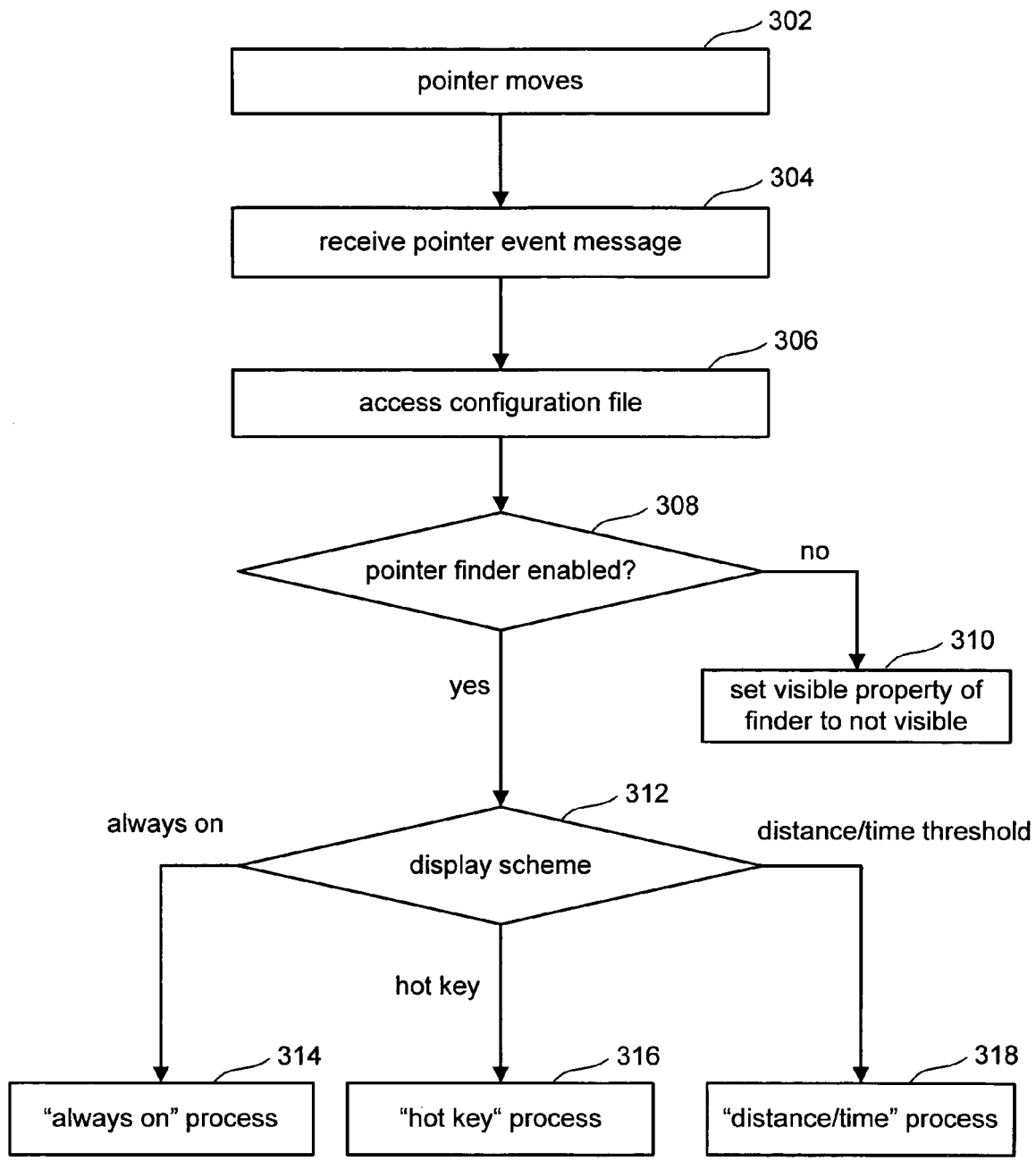
FIG. 5 is a flow chart describing one embodiment of a process for providing a visual image to help locate a pointer.

FIG. 5 is a flow chart describing one embodiment of a process for providing pointer finder 260. In step 302, the pointer 250 moves. In response to that movement, a pointer event message is provided in step 304. In some implementations, the pointer event message is referred to as a mouse event message. In one embodiment, the operating system (e.g., operating system 134) is configured to provide a mouse event message to a software process (e.g. application program, program modules or other types of code) or a hardware entity that registers with the operating system using an Application Program Interface (API). The pointer event message received in step 304 will indicate a new position for the pointer 250. This indication will be a new X position and a new Y position. In one embodiment, the operating system can provide a pointer event message only when the pointer moves. In other embodiments, the pointer event message can be provided periodically regardless of whether the pointer moves.

In response to the pointer event message, a configuration file will be accessed. This configuration file will indicate whether the pointer finder function is enabled. Additionally, if the pointer finder function is enabled, the configuration file will indicate which pointer finder scheme is enabled. For example, the pointer finder can be always on, displayed when a hot key is pressed, or provided when a certain time/distance threshold is met. Other schemes can also be used. In some embodiments, the pointer finder function may always be enabled and the user will only get to choose which of the various schemes to use.

If the pointer finder function is not enabled (step 308), then the pointer finder is not made visible to the user (step 310). In one embodiment, each item visible on display 191 will have an object associated with that item. The object, stored in memory, will include a set of properties. One of the properties will indicate whether the item is visible or not. Other properties will indicate the position, size, shape, etc. of the item. In one embodiment of step 310, the property that indicates whether the item is visible or not ("the visible property") is set so that the item is not visible.

In some embodiments, the operating system will refresh display 191 periodically. When it refreshes display 191, the operating system will check the visible property for each item. If the object has a visible property set to visible, then the object will then be displayed on display 191 when the operating system refreshes the screen. If the item has its visible property set to not visible, then the item will not be displayed when display 191 is refreshed.

If it is determined that the pointer finder function is enabled (step 308), then the appropriate pointer finder display scheme is determined (step 312) based on data in the configuration file accessed in step 306. If the configuration file indicates that the user has chosen that the pointer finder function always be on, then the "always on" process is performed in step 314. If the configuration file indicates that the pointer finder should be visible when a hot key is pressed, then the "hot key" process is performed in step 316. If the user indicated in the configuration file that the pointer finder should be visible when the pointer has moved a threshold distance in a predefined time, then the "distance/time" process is performed in step 318. Note that in other embodiments, the user can indicate the appropriate scheme in a manner different than using a configuration file. Alternatively, an entity other than the user viewing display 191 can determine which scheme to use. For example, the scheme can be predefined, hardwired, set by a hardware entity, set by a manufacturer, etc. Additionally, other schemes can be used.

Figure 6:
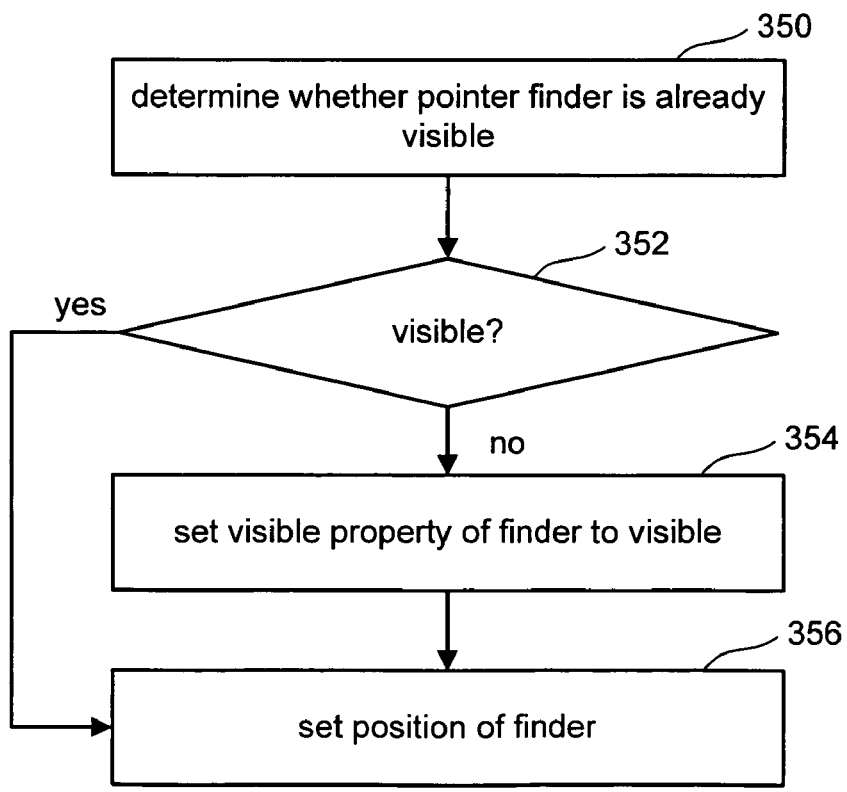
FIG. 6 is a flow chart describing one embodiment of a process for providing a pointer finder that is always visible.

FIG. 6 is a flow chart describing one embodiment of the "always on" process of step 314. In step 350 of FIG. 6, it is determined whether pointer finder 260 is already visible. This can be accomplished by reading the visible property in the object for pointer finder image 282 (see FIG. 4). If the visible property is not set to visible (step 352), then the visible property is then set to visible in step 354. In step 356, the position property of the object for the pointer finder is loaded with the position of pointer 250. In one embodiment, the position property for the pointer finder corresponds to the upper left hand coordinate of image 282. In other embodiments, the position stored in step 354 can correspond to another location within window 282 (e.g., the tip of pointer finder 260). In some embodiments, the position property loaded in step 356 can be loaded with a position offset from pointer 250. Note that if it is determined in step 352 that the window 282 is already visible, then the process of FIG. 6 skips step 354 and proceeds to step 356 in order to set the position of the window 282. One reason that the window may not be visible, even though "always on" is selected, is that the configuration file may have just been updated.

Figure 7:
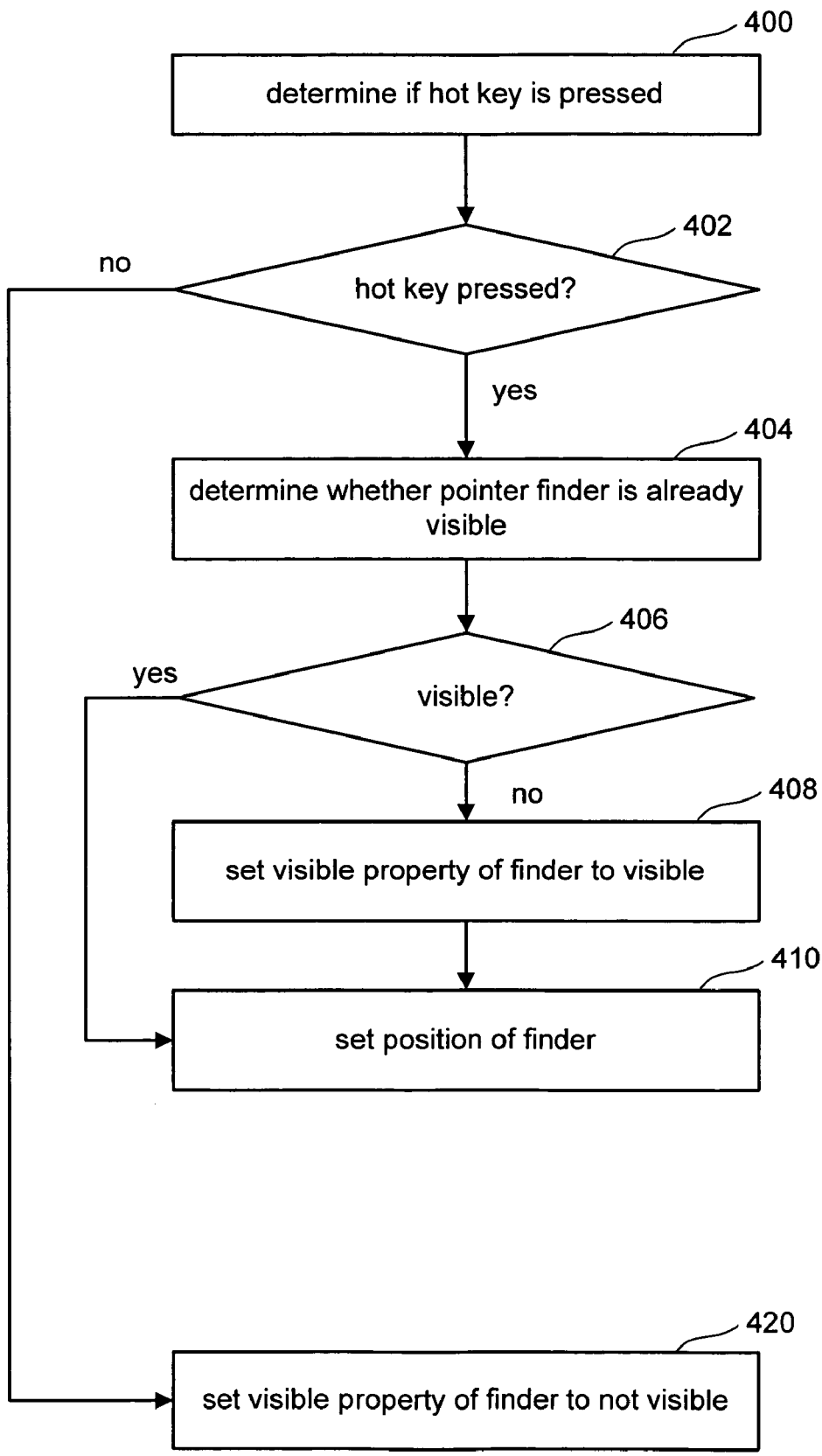
FIG. 7 is a flow chart describing one embodiment of a process for providing a pointer finder that is visible in response to a hot key.

FIG. 7 is a flow chart describing one embodiment of the "hot key" process of step 316. In step 400 of FIG. 7, the system determines whether the particular hot key is pressed. The hot key can be any key on the keyboard or mouse. In some embodiments, the hot key is predefined by the manufacturer. In other embodiments, the hot key is dynamically configurable by the user. In one example implementation, it is determined whether the hot key is pressed by accessing the API for the operating system. For example, in the Windows operating system from Microsoft Corporation, the "GetAsyncKeyState" command is issued to the API for the operating system to determine whether the particular key has been pressed. If the hot key has been pressed (step 402), then it is determined whether pointer finder 260 is already visible in step 404. If it is not visible (step 406), then the visible property is set to make it visible in step 408. In step 410, the new position of the pointer finder is set by setting the appropriate position property (or field) in the object for the pointer finder in step 410. If it was determined that the pointer finder was already visible (step 406), then step 408 is skipped and the process proceeds directly to step 410 to set the new position of the pointer finder. If it was determined that the hot key was not pressed (step 402), then the visible property for the pointer finder is set or maintained so that the pointer finder is not visible.

Figure 8:
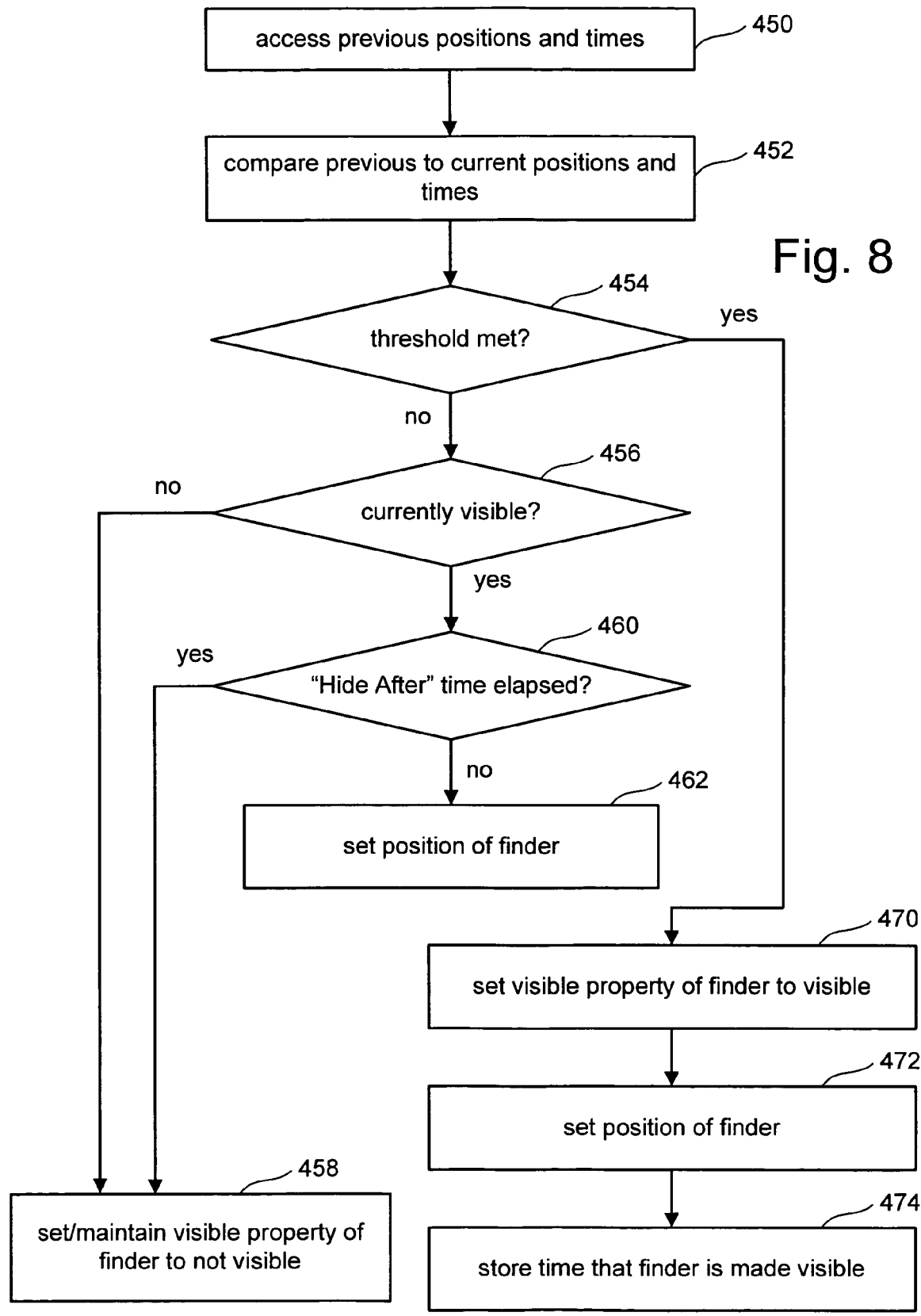
FIG. 8 is a flow chart describing one embodiment of a process for providing a pointer finder that is visible in response to a pointer moving a minimum distance within a predefined time.
Figure 9:
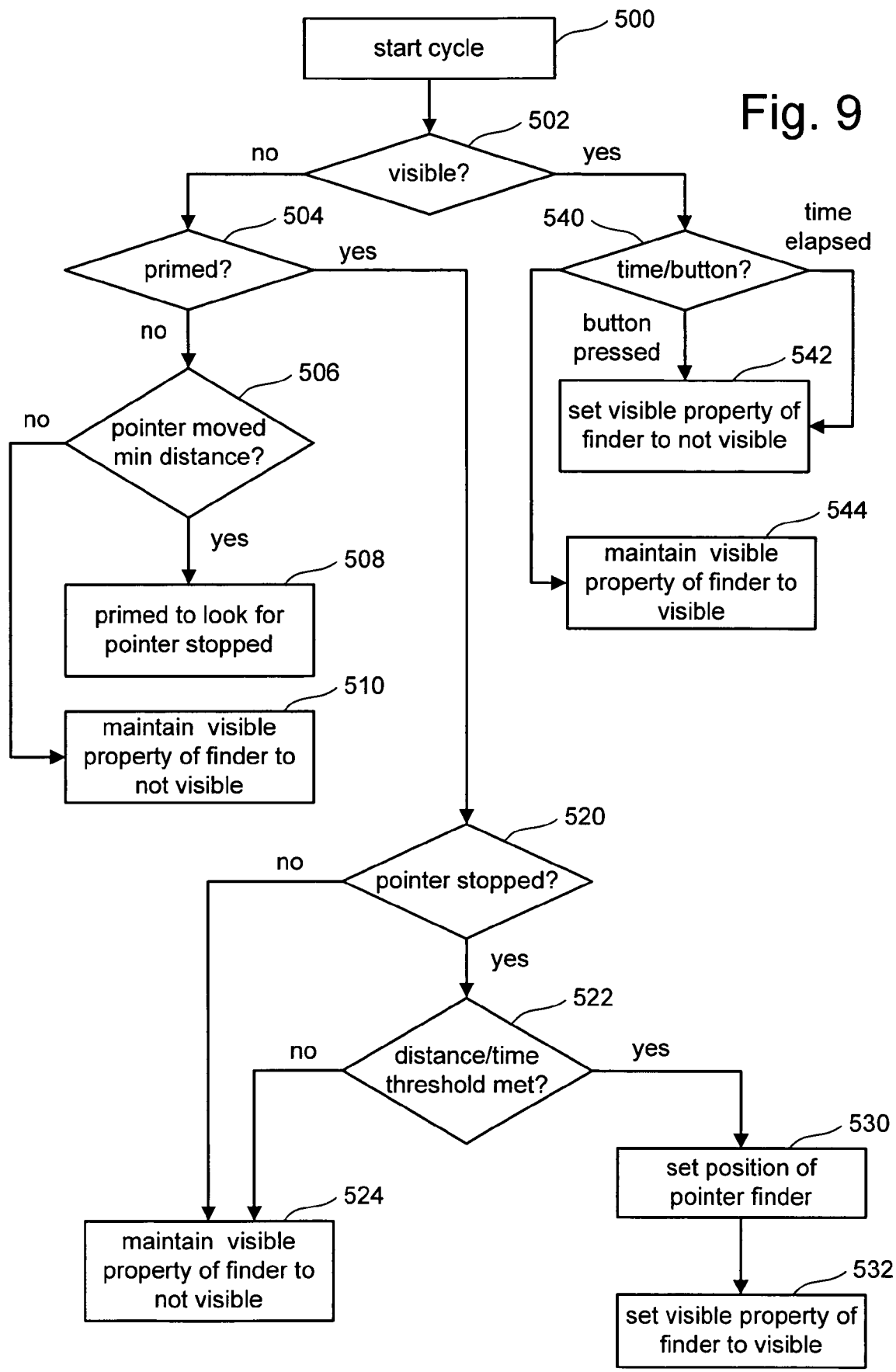
FIG. 9 is a flow chart describing one embodiment of a process for providing a pointer finder that is visible in response to a pointer moving a minimum distance within a predefined time.

FIG. 8 is a flow chart describing one embodiment of performing the "distance/time" process of step 318 of FIG. 5. FIG. 9 is a flow chart describing another embodiment of the "distance/time" process of step 318 of FIG. 5. FIG. 8 will be discussed first.

In step 450 of FIG. 8, previous positions and times will be accessed for the pointer. In one embodiment, each pointer event message can be stored in a data structure. Any suitable data structure known in the art can be used. The data structure should at least store the X and Y positions for each pointer event message and the time associated with each pointer event message. In step 450, a previous set of positions and times are accessed. In one example, the system knows the predefined time for the date/time process. Thus, the system will only access previous positions that are within that predefined time. In step 452, the previous positions accessed in step 450 are compared with the current position and time. It is determined whether the pointer has moved the threshold distance within the predefined amount of time. For example, it can be determined whether the pointer has moved 20 pixels within three milliseconds. In some embodiments, the system will determine whether the pointer has moved a threshold number of pixels in the X direction, a threshold number of pixels in the Y direction, or a threshold number of pixels in any direction. The threshold distance and predefined time can be preset or dynamically configured in advance. In step 454, it is determined whether pointer moved the threshold distance in the predefined time. If not, then in step 456 it is determined whether pointer finder 260 is currently visible. If it is not currently visible, then the visible property for the pointer finder is maintained at not visible in step 458. If it pointer finder 260 is currently visible, then in step 460 it is determined how much time has elapsed since the pointer finder was made visible. The system can store a time value within the object for the pointer finder (or elsewhere) indicating when the pointer finder was made visible and not visible. The system will compare the current time against the time when the pointer was made visible. The configuration file will include a "hide after" time. This "hide after" time can be preset or dynamically configured. If the pointer finder has been visible for the amount of time in the "hide after" setting, then the pointer finder will be removed from the screen by setting the visible property to not visible. Thus, after the pointer has moved the threshold distance within the predefined time, the pointer finder will remain visible until the "hide after" time has elapsed. If the "hide after" time has not elapsed (see step 460), then in step 462 the position property for the object associated with the pointer finder is updated to the new position of the pointer (or other position, offset, etc.) in step 462.

If, in step 454, it is determined that the pointer has moved the threshold distance in the predefined time, then the visible property for the pointer finder is set to visible in step 470, the position parameter for the object associated with the pointer finder is updated to the new position of the pointer (or offset) in step 472, and the time that the pointer finder has become visible is stored in step 474.

FIG. 9 is a flow chart describing another embodiment of the "distance/time" process 318. In step 500, a new cycle is started. The process of FIG. 9 is performed in response to a periodic timer. For example, every 16 msec, step 500 is performed to start a new cycle. In step 502, it is determined whether the pointer finder is visible. If it is not visible, it is determined whether the process is primed to look for whether the pointer has stopped moving (see step 508). If the system is not primed, then in step 506 it is determined whether the pointer has moved a minimum distance (e.g., three pixels, or another value). If the pointer has moved the minimum distance, then the system is then primed, which means that the system is looking for whether the pointer has stopped. In one embodiment, the system looks for whether the pointer has stopped for four cycles. If, in step 506, it is determined that the pointer has not moved the minimum distance, then in step 510, the visible property for the pointer finder remains non-visible.

If it was determined in step 504 that the system is primed to look for the pointer being stopped, then in step 520 it is determined whether the pointer has stopped. In one embodiment, the pointer is defined to be stopped if it has not moved for four cycles. In other embodiments, other number of cycles can be used or a different definition of "stopped" can be used. If the pointer has stopped, then in step 522 it is determined whether the pointer has moved the threshold distance within the predefined time. If not, then the visible property for the pointer finder remains not visible in step 524. Additionally, if the pointer is determined not to be stopped in step 520, then in step 524 the visible property for the pointer finder is maintained as not visible. If in step 522, it is determined that the pointer has moved the threshold distance within the predefined time, then the position property for the pointer finder is updated in step 530 and the visible property for the pointer finder is updated to visible in step 532.

If, in step 502 of FIG. 9, it is determined that the pointer finder is already visible (determined by checking the visible property for the pointer finder), then in step 540 it is determined whether the "hide after" time has elapsed or a mouse button (or other predefined button) has been pressed. If the "hide after" time has elapsed, then in step 542 the visible property for the pointer finder is set to not visible. If the mouse button (or other button) has been pressed, then in step 542 the visible property for the pointer finder is set to not visible. Otherwise, the visible property for the pointer finder remains as visible.

Another means for making it easier for a user to find the pointer in a large display is to blank all of the monitors except for the monitor that the pointer is on. In one embodiment, a hot key can be specified. If the hot key is pressed and the user moves the mouse (or other pointing device), then all of the monitors will be blanked out except for the monitor that contains the pointer. In another embodiment, the monitor blanking can be commenced by the pointer moving a certain threshold, or other trigger. In one embodiment, a monitor can be blanked by drawing a window on the monitor, where the window is the full size of the viewable region of the monitor and the window is all black. In another embodiment, the window can be a different color, different pattern, or a different size. The monitor blanking feature can be turned on or off by controlling a setting in the configuration file.

Figure 10:
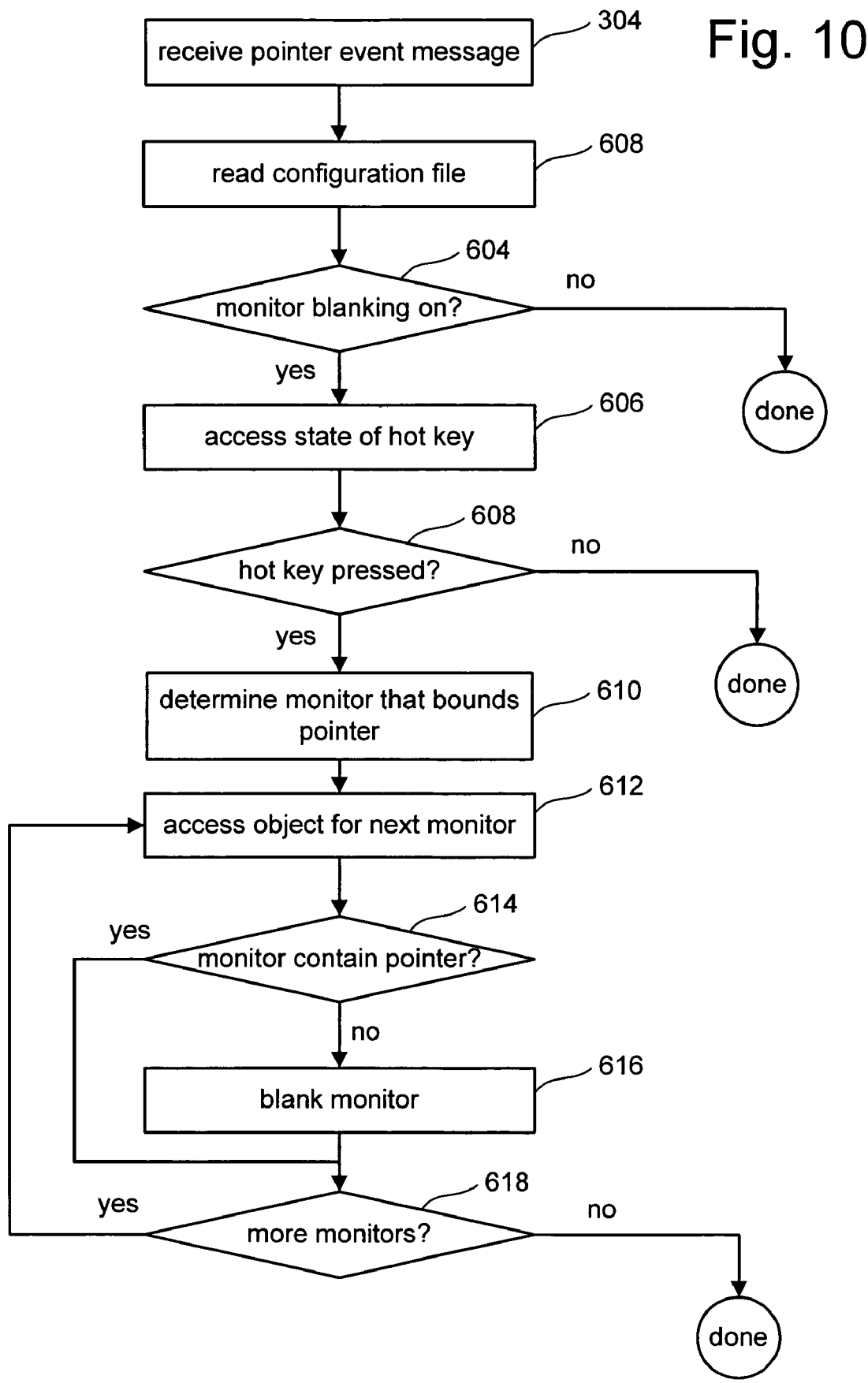
FIG. 10 is a flow chart describing one embodiment of a process for blanking monitors that do not bound the pointer.

FIG. 10 depicts a flow chart describing one embodiment for blanking monitors to aid in finding the pointer. The process for blanking the monitors is performed in response to receiving the pointer event message in step 304. The system will then read the configuration file in step 602 to determine whether the monitor blanking feature is enabled. If it is not enabled, the process of FIG. 10 is completed. If the monitor blanking feature is enabled, then in step 606, the system will access the state of the hot key to determine whether the hot key is pressed or not. If the hot key is not pressed (step 608), then the process of FIG. 10 is completed and no monitors will be blanked. If the hot key is pressed, then in step 610, a determination is made as to which monitor the pointer is within. In one embodiment, the API for the operating system will have a command to request the ID for the object associated with the monitor that is displaying the pointer. In the Windows operating system for Microsoft Corporation, one example of the API command is "Screen.FromPoint(pt)." Once it is determined which monitor is displaying pointer 250, all the other monitors need to be blanked. In step 612, an object for a monitor is accessed. In step 614, it is determined whether that object is for the monitor that is displaying the pointer 250. A determination can be made by comparing the monitor ID in the object accessed in step 612 to the monitor ID received from the operating system in step 610. If the IDs do not match (step 614), then the monitor is blanked in step 616. In step 618, it is determined whether there are any more monitors to consider. If not, the process of FIG. 10 is complete. If there are more monitors to consider, then the process moves back to step 612 and the object for the next monitor is accessed. The loop from step 612 to step 618 will be performed for each monitor so each monitor that has an ID that does not match the ID returned in step 610 will have a window drawn on it so that the monitor appears to be blanked. Other means of blanking the monitor can also be used, such as turning off the monitor, drawing another image, etc.

The process of blanking monitors (see FIG. 10) can be performed separately from or in combination with the process for displaying the pointer finder (FIGS. 5-9). In one embodiment, both process are performed in response to receiving a pointer event message. The two processes can then be performed concurrently.

In addition to being hard to find the pointer, a large display also makes it harder to move the pointer across the display. For example, display 191 is six columns wide. Moving the pointer from the left-most column to the right-most column could require a lot of effort by the user operating the mouse, trackball, touchpad, etc. One solution to alleviate this problem is to allow pointer 250 to snap to the center of adjoining monitors as it moves across display 191. For example, if pointer 250 was on display 207 and it is desired to move pointer 250 to display 212, as the user starts to move pointer 250 toward display 212, the system can snap the location of pointer 250 to the center of monitor 208, then to the center of monitor 209, then to the center of monitor 210, then to the center of monitor 211, and then to the center of monitor 212. Once at the center of monitor 212, the user can move the pointer to the exact location within monitor 212. By snapping to the center of adjacent monitors, less work is required by the user to move pointer 250 across display 191. The snapping can be performed when moving the pointer 250 vertically, horizontally or diagonally. In one embodiment, snapping will only be performed for horizontal and vertical movement, and not for diagonal movement.

Figure 11:
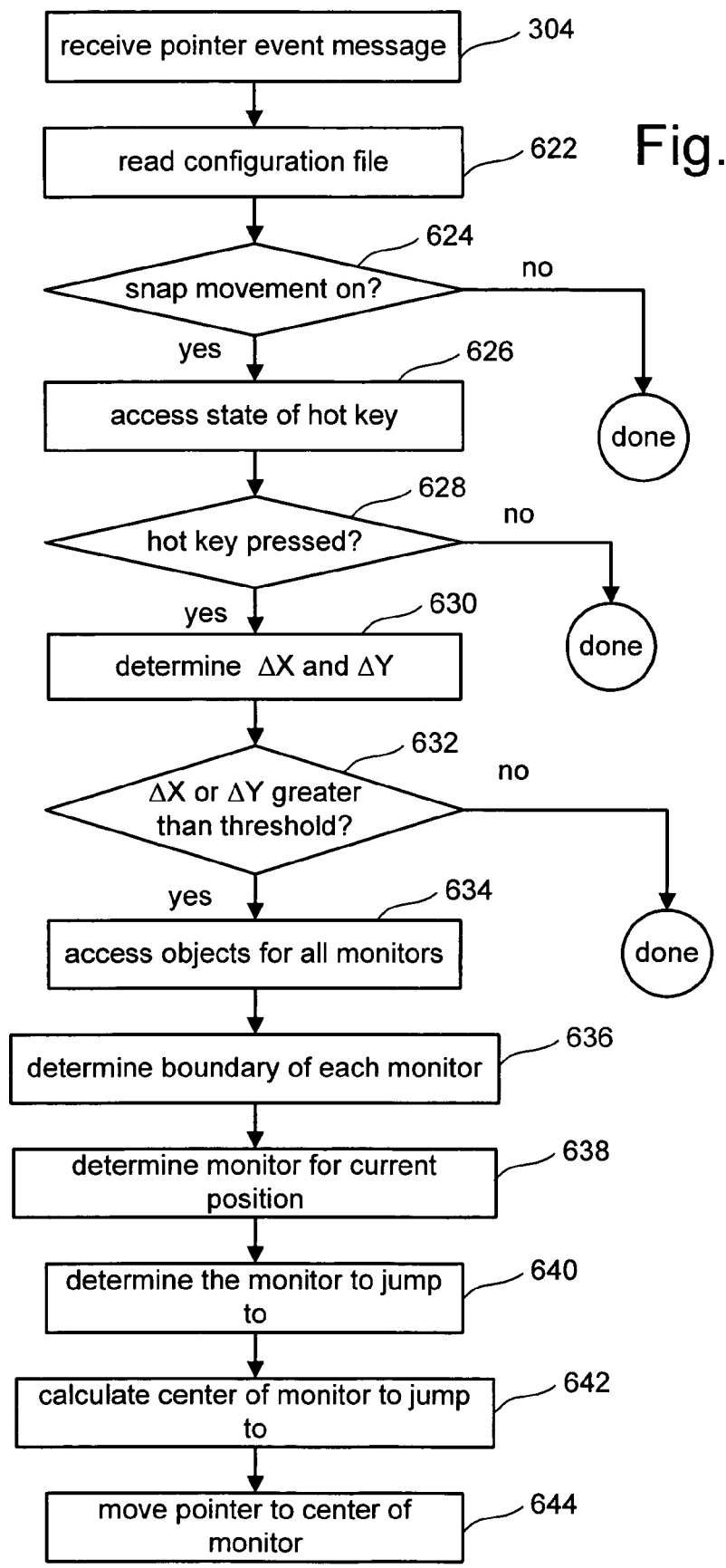
FIG. 11 is a flow chart describing one embodiment of a process for providing a snap movement feature.

FIG. 11 is a flow chart describing one embodiment for performing the snap movement discussed above. The process of FIG. 11 is performed in response to receiving a pointer event message in step 304. The system will then read the configuration file in step 622 to determine whether the snap movement feature is enabled. If the snap movement feature is not enabled, then the process of FIG. 11 is completed. If the snap movement process is enabled, then in step 626 it is determined whether the hot key has been pressed. In one embodiment, the snap movement feature will only be performed if a hot key (preset or dynamically configurable) is pressed. In other embodiments, the snap movement feature can be performed in response to pointer being moved a predetermined distance during a predetermined time. If the hot key was not pressed (step 628), then the process of FIG. 11 is completed. If the hot key was pressed, then in step 630, it is determined the amount of distance in pixels (or other units) the pointer has moved in the X direction and the Y direction (referred to as ΔX and ΔY) since the last pointer event message. In one embodiment, there will be predefined threshold for how much distance the pointer had to move in either the X or the Y direction. In other embodiments, there can be a separate threshold for the X direction and a separate threshold for the Y direction. If ΔX and ΔY are both not greater than the threshold, then the process of FIG. 11 is completed. If either ΔX or ΔY is greater than the threshold (preset or dynamically configurable), then in step 634 the objects for all monitors are accessed. In step 636, a determination is made as to the boundary coordinates for each monitor based on data in the objects for the monitors. In step 638, the ID for the monitor displaying the pointer is identified, as described above. In step 640, the monitor to jump to is determined. Based on ΔX and ΔY, the system can determine the direction that the pointer is moving. A line can be determined from the previous (X,Y) position to the current (X,Y) position and the system can extend that line until it reaches an adjacent monitor. That adjacent monitor is the monitor that the pointer should jump to. In step 642, the ID for that adjacent monitor is identified and the center (X,Y) coordinates for that monitor are determined. In step 644, the pointer location is automatically changed to the center coordinates of that adjacent monitor using an API call to the operating system. The next time that the operating system updates the display, the pointer will automatically be displayed at the center coordinates of that adjacent monitor.

The process performing the snap movement (see FIG. 11) can be performed in response to multiple event messages so that a pointer will snap to multiple adjacent monitors. For example, a pointer starting on monitor 215 of FIG. 2 can snap to monitor 216, then snap to monitor 27 and then snap to monitor 218.

The process performing the snap movement (see FIG. 11) can be performed separately from or in combination with the process for displaying the pointer finder (FIGS. 5-9). In one embodiment, both process are performed in response to receiving a pointer event message. The two processes can then be performed concurrently, sequentially or in another manner. The pointer finder can be rendered before the snap movement (including immediately before the snap movement) and after the snap movement (including immediately after the snap movement) based on the same pointer event message or different pointer event messages. Before and after snapping the pointer to an adjacent monitor, it can be very helpful to the user to have pointer finder 260 visually indicate where pointer 250 is positioned.

Another issue with large displays is that multiple pointing devices may be used. For example, multiple users may each use their own pointing devices (e.g., mouse, track ball, touchpad, etc.). Alternatively, one user may use multiple pointing devices. For example, two mice may be used. In some operating systems, although multiple pointing devices are supported, only one pointer will be on the screen. Thus, the multiple pointing devices will control the same pointer 250. Thus, either pointing device can move pointer 250. This can be confusing to the one or more users who are using the pointing devices. One solution is that upon activation of a pointing device, the software positions pointer 250 at the last known pixel location for that pointing device. For example, if there are two mice, let's call them mouse 1 and mouse 2. Mouse 1 may be moving pointer 250 in monitor 213 and mouse 2 may be moving pointer 250 in monitor 206. When mouse 1 starts moving, the pointer will jump to the last location known for the pointer 250 in monitor 213. If mouse 2 starts moving, then the pointer will automatically jump to the last known location in monitor 206 associated with mouse 2 moving pointer 250.

FIG. 12 is a flow chart describing one embodiment of a process for accomplishing the pointer location memory feature described above. The process of FIG. 12 is performed in response to receiving the pointer event message in step 304. In step 702, the configuration file is read to determine whether the pointer location memory feature is enabled. If it is not enabled, the process of FIG. 12 is completed. If it is enabled, then it is determined whether the active pointing device (the device that is controlling the pointer—e.g., mouse, trackball, touch pad, etc) has changed in step 706. Each pointer event message includes an ID for the pointing device moving the pointer. Step 706 can include comparing the pointer ID received from the current pointer event message to the pointer ID received from the previous pointer event message. If the active pointing device has not changed (e.g., the IDs match), then the process of FIG. 12, is completed. If the IDs do not match and, therefore, the active pointing device has changed, then in step 708 the pointing device location for the current position of the mouse and the ID associated with the last pointer event message are stored for later use. In step 710, the ID from the current pointer event message is used to find the location data (e.g., a x, y position) for the pointer associated with for the last mouse message received with that ID. In step 712, the pointer is moved to the location identified in step 710. Step 712 can be accomplished by using the API to instruct the operating system to move the mouse to a particular X and Y position. The process of FIG. 12 can be used to change between pointer positions on the same monitor or pointer positions on different monitors.

The process of using pointer memory to move the pointer between positions associated with different pointers (see FIG. 12) can be performed separately from or in combination with the process for displaying the pointer finder (FIGS. 5-9). In one embodiment, both process are performed in response to receiving a pointer event message. The two processes can then be performed concurrently, sequentially, or in another manner. The pointer finder can be rendered before moving the pointer in step 712 of FIG. 12 and/or after moving the pointer in step 712 based on the same pointer event message or different pointer event messages. Before and after moving the pointer in step 712 of FIG. 12, it can be very helpful to the user to have pointer finder 260 visually indicate where pointer 250 is positioned.

Figure 13A:
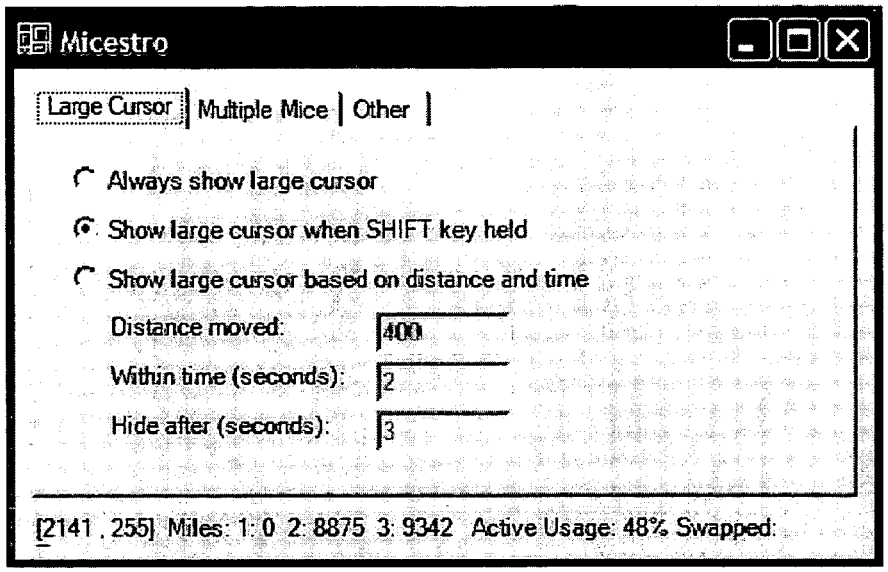
FIGS. 13A and 13B depict a configuration interface.
Figure 13B:
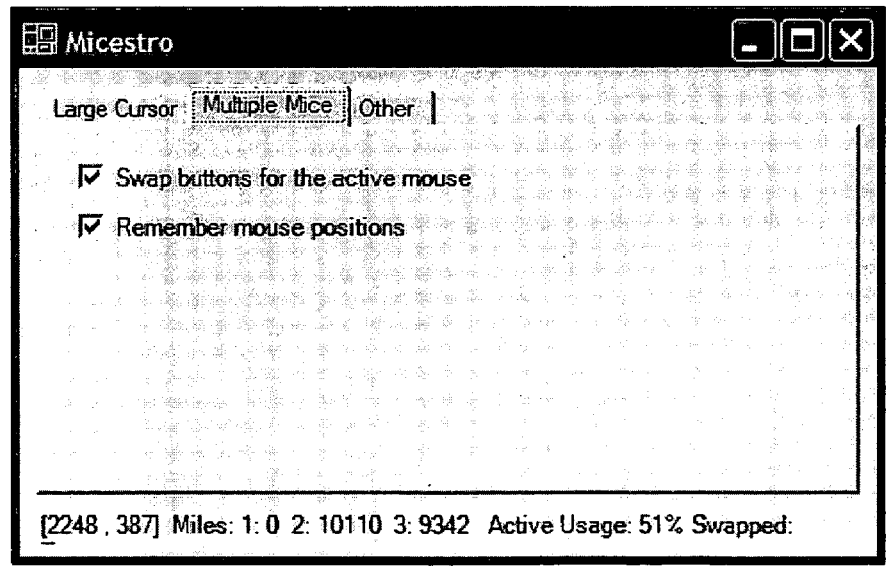

FIGS. 13A and 13B provide examples of the configuration interface. They include three tabs for accessing three different pages of the interface. A first tab is for the large cursor or pointer finder feature. A second tab is used for multiple mice or pointer location memory feature. A third tab, labeled other, can be used to enable the snap movement and/or blanking features. As can be seen from FIG. 13A, a user accessing the Large Cursor tab can choose whether the pointer finder is always on, only on when the hot key is pressed (e.g., shift key), or when a threshold of distance and time is met. FIG.

13B indicates that a user can choose whether to remember mouse positions or not. Additionally, the pointer device buttons can be swapped for left and right-handed persons separately for each pointing device.

Figure 14:
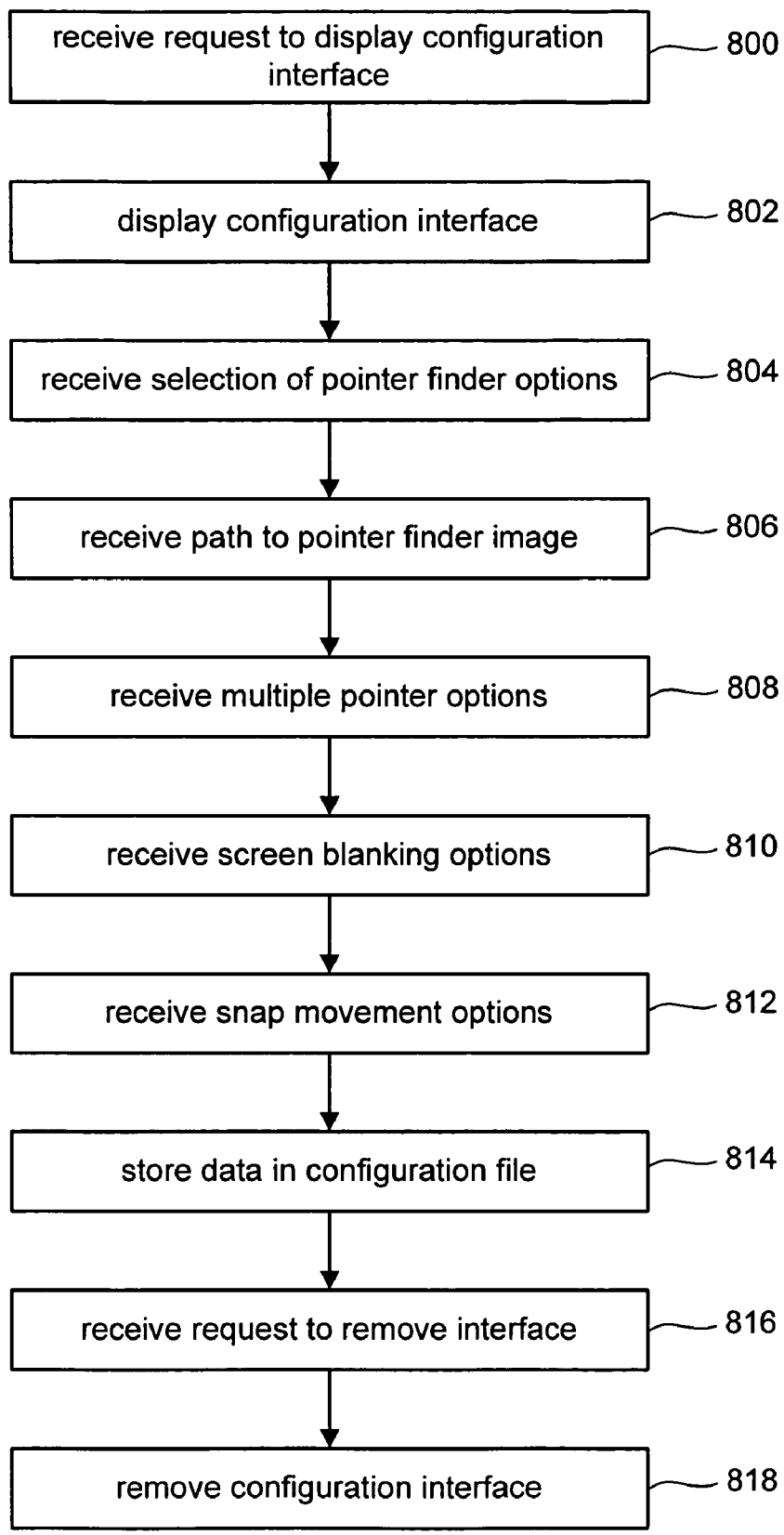
FIG. 14 is a flow chart describing one embodiment of a process for using a configuration interface.

FIG. 14 is a flow chart describing one embodiment of a process for accessing the interface depicted in FIG. 13A and FIG. 13B. In step 800, the system will receive a request to display the configuration interface of FIGS. 13A and 13B. In step 802, the configuration interface is displayed. In step 804, the user will select one or more checkboxes (or other input items) related to the various schemes for the pointer finder and those selections will be received by the system in step 804. In step 806, the user can provide a path to an image for the pointer finder (not depicted in FIG. 13A). In step 808, various multiple pointer options can be provided (e.g., interface in FIG. 13B). In step 810, screen blanking options can be provided by the user. In step 812, the snap movement options can be provided (e.g., enable snap movement). In step 814, the data received from the user in the interface is stored in the configuration file. In step 816, the user can request to remove the interface. Step 818 includes the removing the configuration interface in response to step 816.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A method for operating a pointer on a display having multiple monitors including a first monitor and a second monitor, comprising:

receiving a first event message for a pointer on a display, the first event message indicating a first pixel location of the pointer in the display and a first time;

determining that said pointer is moving on said display in a direction toward said second monitor based on receiving a second event message for the pointer, the second event message indicating a second pixel location of the pointer in the display and a second time, said pointer is displayed on said first monitor;

automatically moving said pointer to said second monitor before said pointer has reached the edge of said first monitor in response to said pointer moving on said first monitor between the first pixel location and the second pixel location within a predetermined time, wherein the distance between said first pixel location and said second pixel location is at least twenty pixels and said predetermined time is within milliseconds; and causing an image to be provided on said display that visually indicates said pointer, said image is a different image than said pointer and is larger than said pointer.

2. A method according to claim 1, wherein:
said automatically moving said pointer includes moving said pointer to a center location of said second monitor.

3. A method according to claim 1, wherein:
said causing said image includes causing said image to be provided on said first monitor before automatically moving said pointer to said second monitor.

4. A method according to claim 1, wherein:
said causing said image includes causing said image to be provided on said second monitor after automatically moving said pointer to said second monitor.

5. A method according to claim 1, further comprising:
receiving indications of position of said pointer on said display, said determining that said pointer is moving on said display is performed in response to said indications, said causing an image to be provided on said display is performed in response to one or more of said indications.

6. A method according to claim 1, further comprising:
receiving an indication that a hot key is pressed prior to automatically moving said pointer to said second monitor.

7. A method according to claim 1, wherein:
said display includes a third monitor;
determining that said pointer is moving on said display in a direction toward said third monitor after said pointer was moved to said second monitor;
automatically moving said pointer to said third monitor before said pointer has reached said third monitor; and
causing said image to be provided on said third monitor.

8. A method according to claim 1, wherein:
receiving an indication from a user whether said image should always be visible, be visible in response to a hot key, or be visible in response to said pointer moving a minimum distance in a predefined time.

9. A method according to claim 1, wherein:
said image is a window that includes a viewable foreground and a transparent background.

10. An apparatus that can operate a pointer on a display, comprising:
an interface to a pointer controlling device;
an interface to said display; and
one or more processors in communication with said interface to said display and said interface to said pointer controlling device, said one or more processors receive an indication of a position of said pointer on said display and selectively cause an image to be provided on said display visually indicating said position of said pointer in response to receiving said indication, said image is a different image than said pointer and is larger than said pointer;
said selectively causing an image to be provided on said display includes determining whether said pointer has moved on said display a threshold distance, waiting for said pointer to stop moving on said display after determining that said pointer has moved on said display a threshold distance, determining whether said pointer moved on said display a minimum distance within a defined time frame, and causing said image to be displayed for a predefined time duration if said pointer moved on said display said minimum distance within said defined time frame.

11. An apparatus according to claim 10, wherein:
said display includes multiple monitors; and
said image is user changeable.

12. An apparatus according to claim 10, further comprising:
one or more storage devices, said one or more storage devices store operating system code and program code, said operating system code provides event messages to said program code, said indication of said position of said pointer on said display is provided in one of said event messages, said one or more storage devices store an object representing said image, said selectively causing an image to be provided on said display includes setting a visibility property for said object.

\* \* \* \* \*

UNITED STATES PATENT AND TRADEMARK OFFICE
CERTIFICATE OF CORRECTION

PATENT NO. : 7,598,941 B2
APPLICATION NO. : 11/173547
DATED : October 6, 2009
INVENTOR(S) : Leuder et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1131 days.

Signed and Sealed this

Twenty-eighth Day of September, 2010

David J. Kappos
*Director of the United States Patent and Trademark Office*